(12) United States Patent
Huang

(10) Patent No.: US 10,232,581 B1
(45) Date of Patent: *Mar. 19, 2019

(54) CARBON FIBER TUBE WITH INCREASED RIGIDITY AND DECREASED WEIGHT

(71) Applicant: Dorge O. Huang, Henry, IL (US)

(72) Inventor: Dorge O. Huang, Henry, IL (US)

(*) Notice: Subject to any disclaimer, the term of this patent is extended or adjusted under 35 U.S.C. 154(b) by 159 days.

This patent is subject to a terminal disclaimer.

(21) Appl. No.: 15/409,624

(22) Filed: Jan. 19, 2017

(51) Int. Cl.
| | | |
|---|---|---|
| *B32B 1/08* | (2006.01) | |
| *F16L 9/04* | (2006.01) | |
| *F41B 5/14* | (2006.01) | |
| *B32B 5/02* | (2006.01) | |
| *B32B 5/12* | (2006.01) | |
| *B32B 18/00* | (2006.01) | |
| *F42B 6/04* | (2006.01) | |

(52) U.S. Cl.
CPC .............. *B32B 1/08* (2013.01); *B32B 5/02* (2013.01); *B32B 5/024* (2013.01); *B32B 5/12* (2013.01); *B32B 18/00* (2013.01); *F16L 9/042* (2013.01); *F41B 5/14* (2013.01); *F41B 5/1403* (2013.01); *F42B 6/04* (2013.01); *B32B 2262/106* (2013.01); *B32B 2307/718* (2013.01); *B32B 2307/734* (2013.01)

(58) Field of Classification Search
CPC ........... B32B 5/02; B32B 5/022; B32B 5/024; B32B 5/026; B32B 5/08; B32B 5/12; B32B 1/08; F16L 9/04; F16L 9/042; F16L 9/14; F16L 9/16; F41B 5/00; F41B 5/10; F41B 5/14; F41B 5/1403; F42B 6/02; F42B 6/04

See application file for complete search history.

(56) References Cited

U.S. PATENT DOCUMENTS

| | | | |
|---|---|---|---|
| 8,579,739 B2 | 11/2013 | Song | |
| 10,145,643 B1 * | 12/2018 | Huang | ................. F41B 5/1403 |
| 2006/0084534 A1 | 4/2006 | Flowers et al. | |

* cited by examiner

*Primary Examiner* — Walter Aughenbaugh
(74) *Attorney, Agent, or Firm* — Donald J. Ersler

(57) ABSTRACT

A carbon fiber tube preferably includes first, second and third carbon fiber sheets. The first carbon fiber sheet includes a cross weave pattern of fibers, which cross each other at substantially 90 degrees. One axis of the fibers of the first carbon fiber sheet is aligned to form a lengthwise axis of the carbon fiber tube. The second carbon fiber sheet includes the same cross weave pattern as the first carbon fiber sheet. One axis of the fibers of the second carbon fiber sheet is turned 45 degrees relative to the lengthwise axis. The third carbon fiber sheet includes the same cross weave pattern as the first carbon fiber sheet. One axis of the fibers of the third carbon fiber sheet is aligned with the lengthwise axis of the carbon fiber tube. The first, second and third carbon fiber sheets are baked in an autoclave.

12 Claims, 3 Drawing Sheets

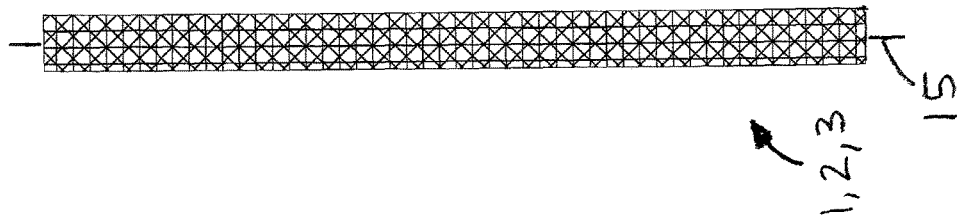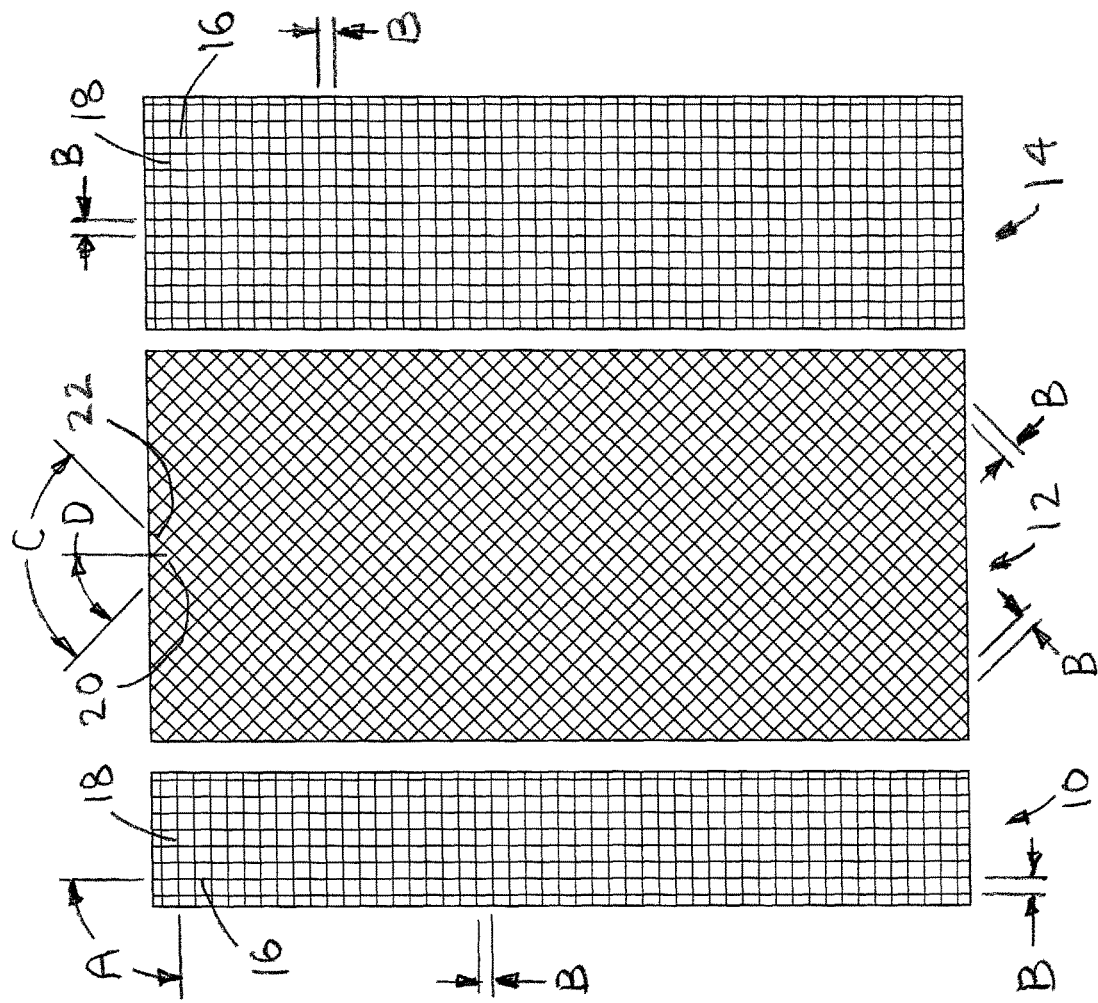

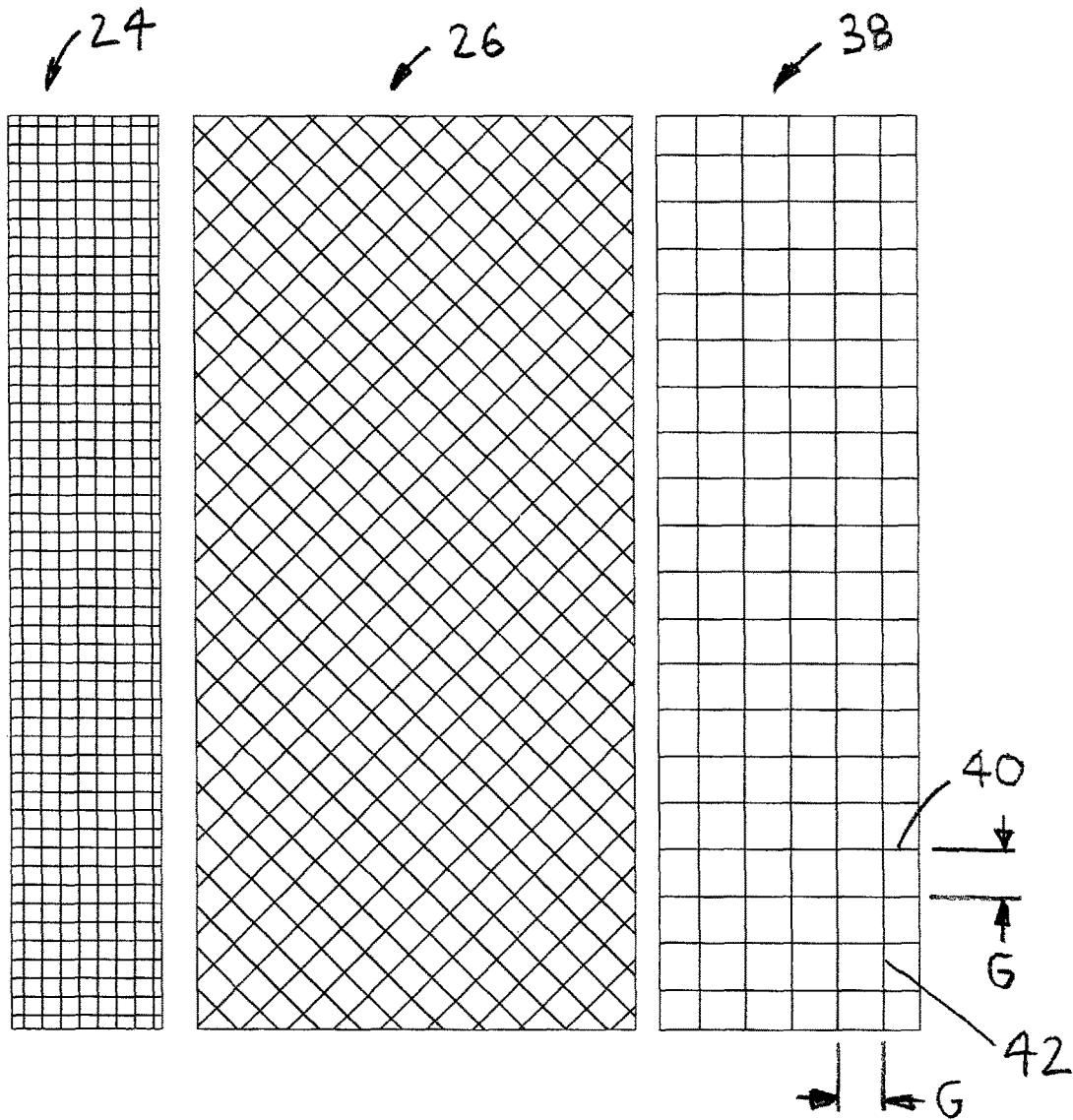
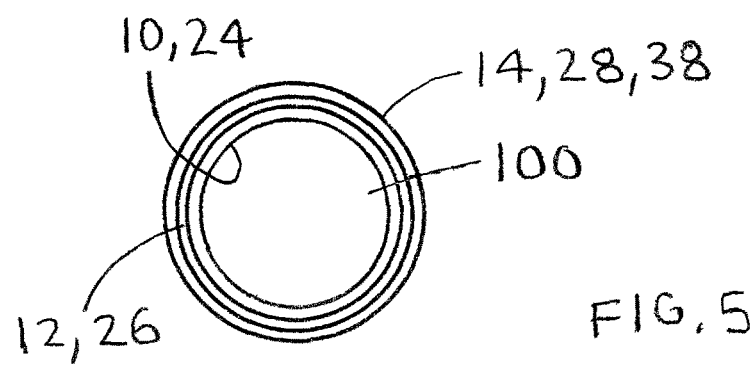

CARBON FIBER TUBE WITH INCREASED RIGIDITY AND DECREASED WEIGHT

BACKGROUND OF THE INVENTION

1. Field of the Invention

The present invention relates generally to carbon fiber and more specifically to a carbon fiber tube with increased rigidity and decreased weight, which utilizes a carbon fiber sheet with a cross weave fiber pattern turned 45 degrees relative to an axis of a tube that has the unexpected result of increased rigidity and decrease weight.

2. Discussion of the Prior Art

Patent application no. 2006/0084534 to Flowers et al. discloses a filament wound multi-color arrow shaft. U.S. Pat. No. 8,579,739 to Song discloses an arrow shaft having front/rear two-stage spine structure.

Accordingly, there is a clearly felt need in the art for a carbon fiber tube with increased rigidity and decreased weight, which utilizes a carbon fiber sheet with a cross weave fiber pattern turned 45 degrees relative to an axis of a tube that has the unexpected result of greater strength with less carbon fiber material.

SUMMARY OF THE INVENTION

The present invention provides a carbon fiber tube with increased rigidity and decreased weight, which utilizes a carbon fiber sheet with a cross weave fiber pattern turned 45 degrees relative to an axis of a tube that has the unexpected result of greater strength. The carbon fiber tube with increased rigidity and decreased weight (carbon fiber tube) preferably includes a first carbon fiber sheet, a second carbon fiber sheet and a third carbon fiber sheet. The first carbon fiber sheet includes a cross weave pattern of fibers, which cross each other at substantially 90 degrees. One axis of the fibers of the first carbon fiber sheet is aligned to form a lengthwise axis of the carbon fiber tube. The second carbon fiber sheet includes the cross weave pattern of fibers, which cross each other at substantially 90 degrees. One axis of the fibers of the second carbon fiber sheet is turned 45 degrees relative to the lengthwise axis of the carbon fiber tube. The third carbon fiber sheet includes the cross weave pattern of fibers, which cross each other at substantially 90 degrees. One axis of the fibers of the third carbon fiber sheet is aligned with the lengthwise axis of the carbon fiber tube. The first carbon fiber sheet is wrapped around a mandrill; the second carbon fiber sheet is wrapped around the first carbon fiber sheet; and the third carbon fiber sheet is wrapped around the second carbon fiber sheet. The mandrill with the first, second and third carbon fiber sheets is baked in an autoclave. The spacing between carbon fibers in the first, second and third carbon fiber sheets may be the same or different.

Accordingly, it is an object of the present invention to provide a carbon fiber tube, which utilizes a carbon fiber sheet with a cross weave fiber pattern turned 45 degrees relative to an lengthwise axis of a tube that has the unexpected result of greater strength with less carbon fiber material.

These and additional objects, advantages, features and benefits of the present invention will become apparent from the following specification.

BRIEF DESCRIPTION OF THE DRAWINGS

FIG. 1 is an exploded top view of three carbon fiber sheets with identical spacing between a plurality of carbon fibers of a carbon fiber tube in accordance with the present invention.

FIG. 2 is a top view of a carbon fiber tube wrapped on a mandrill, before baking in an autoclave in accordance with the present invention.

FIG. 4 is an exploded top view of three carbon fiber sheets with spacing between a plurality of carbon fibers in a second carbon fiber sheet being greater than the spacing in a first carbon fiber sheet, a spacing between a plurality of fibers in a third carbon fiber sheet being greater than the spacing in the second carbon fiber sheet of a carbon fiber tube in accordance with the present invention.

FIG. 5 is an enlarged end view of carbon fiber tube wrapped on a mandrill, before baking in an autoclave in accordance with the present invention.

DETAILED DESCRIPTION OF THE PREFERRED EMBODIMENTS

Figure 3:
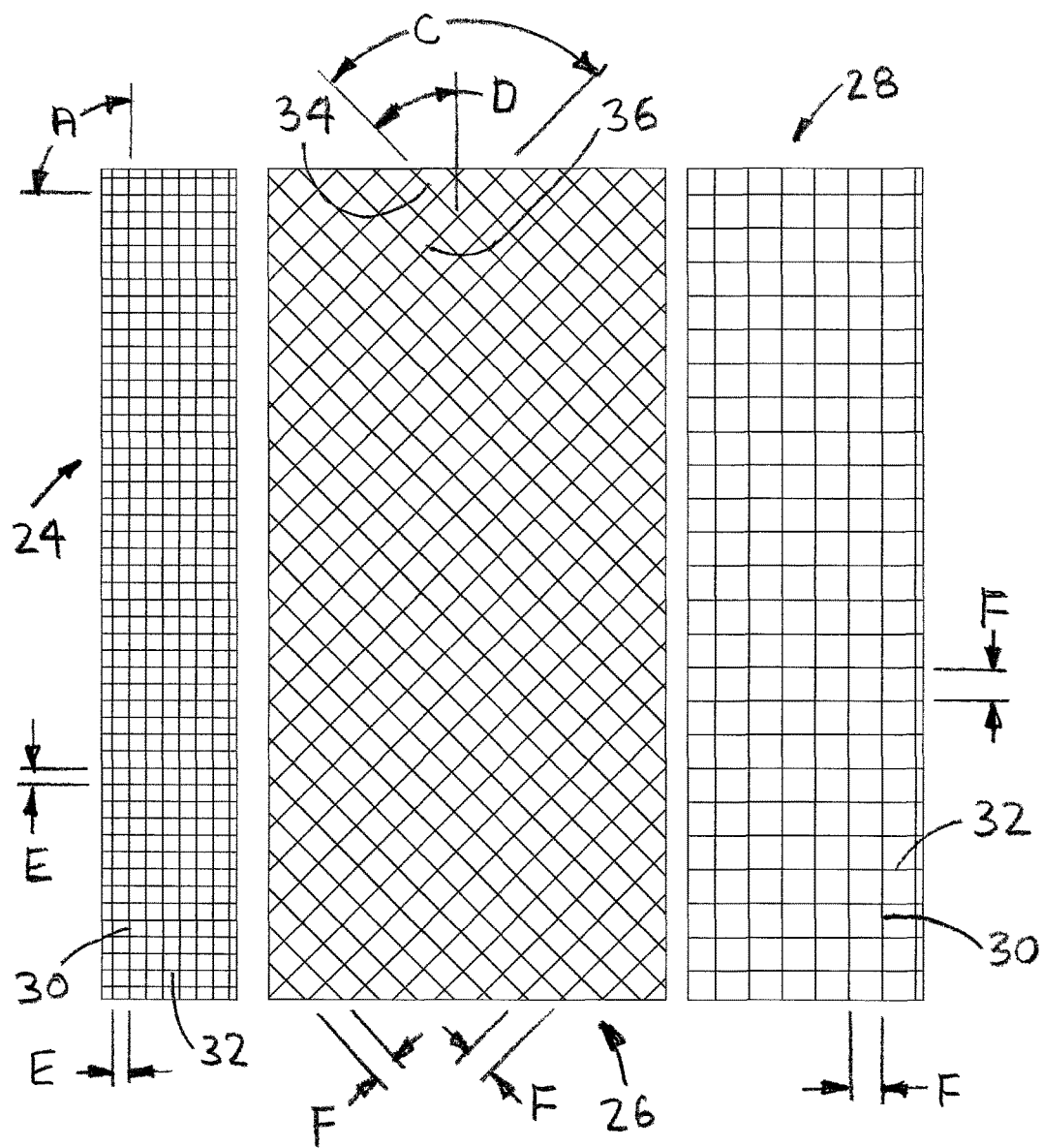
FIG. 3 is an exploded top view of three carbon fiber sheets with spacing between a plurality of carbon fibers in second and third carbon fiber sheets being greater than that of the spacing in a first carbon fiber sheet of a carbon fiber tube in accordance with the present invention.

With reference now to the drawings, and particularly to FIG. 1, there is shown an exploded top view of three carbon fiber sheets 10, 12, 14 of a carbon fiber tube 1. With reference to FIG. 2, the carbon fiber tube 1 preferably includes the first carbon fiber sheet 10, the second carbon fiber sheet 12 and the third carbon fiber sheet 14. The first carbon fiber sheet 10 includes a cross weave pattern of a plurality of carbon fibers 16, 18. The first axis of the plurality of carbon fibers 16 of the first carbon fiber sheet 10 is aligned to form a lengthwise axis 15 of the carbon fiber tube 1. The second axis of the plurality of carbon fibers 18 of the carbon fiber sheet 10 cross the fibers 16 at an angle "A" of about 90 degrees. The plurality of carbon fibers 16 have a spacing distance "B" and the plurality of carbon fibers 18 also have a spacing distance "B." The distance "B" may be any suitable value. The second carbon fiber sheet 12 includes the cross weave pattern of carbon fibers 20, 22, which cross each other at an angle "C" of about 90 degrees. The first axis of the carbon fibers 20 of the second carbon fiber sheet 12 is turned an angle "D" relative to the lengthwise axis 15 of the carbon fiber tube 1. Angle "D" has a value of about 45 degrees. The plurality of carbon fibers 20 have a spacing distance "B" and the plurality of carbon fibers 22 also have a spacing distance "B." The third carbon fiber sheet 14 includes the cross weave pattern of carbon fibers 16, 18, which cross each other at substantially 90 degrees. The first axis of the fibers 16 of the third carbon fiber sheet 14 is aligned with the lengthwise axis 15 of the carbon fiber tube 1.

With reference to FIG. 3, a carbon fiber tube 2 preferably includes a first carbon fiber sheet 24, a second carbon fiber sheet 26 and a third carbon fiber sheet 28. The first carbon fiber sheet 24 includes a cross weave pattern of a plurality of carbon fibers 30, 32. A first axis of the plurality of carbon fibers 30 of the first carbon fiber sheet 24 is aligned to form a lengthwise axis 15 of the carbon fiber tube 1. A second axis of the plurality of carbon fibers 32 of the carbon fiber sheet 26 cross the first axis at an angle "A" of about 90 degrees. The plurality of carbon fibers 30, 32 have a spacing distance "E." The value of spacing distance "E" is any suitable value.

The second carbon fiber sheet 26 includes a cross weave pattern of a plurality of carbon fibers 34, 36, which cross each other at an angle "C" of about 90 degrees. The first axis of the plurality of carbon fibers 34 of the second carbon fiber sheet 26 are turned an angle "D" relative to the lengthwise axis 15 of the carbon fiber tube 2. Angle "D" has a value of about 45 degrees. The plurality of carbon fibers 34, 36 have a spacing distance "F." The third carbon fiber sheet 28 includes the cross weave pattern of fibers 30, 32, which cross each other at substantially 90 degrees. The first axis of the fibers 30 of the third carbon fiber sheet is aligned with the lengthwise axis 15 of the carbon fiber tube 2. The plurality of carbon fibers 34, 36 have a spacing distance "F." The spacing distance "F" is greater than the spacing distance "E."

With reference to FIG. 4, a carbon fiber tube 3 preferably includes the first carbon fiber sheet 24, the second carbon fiber sheet 26 and a third carbon fiber sheet 38. The third carbon fiber sheet 38 includes the cross weave pattern of fibers 40, 42, which cross each other at substantially 90 degrees. The first axis of the fibers 40 of the third carbon fiber sheet is aligned with the lengthwise axis 15 of the carbon fiber tube 3. The plurality of carbon fibers 40, 42 have a spacing distance "G." The spacing distance "G" is greater than the distance spacing "F." The spacing distance "F" is greater than the spacing distance "E."

With reference to FIG. 5, the first carbon fiber sheet 10 is wrapped around a mandrill 100; the second carbon fiber sheet 12 is wrapped around the first carbon fiber sheet 10; and the third carbon fiber sheet 14 is wrapped around the second carbon fiber sheet 12. The mandrill 100 with the first, second and third carbon fiber sheets 10, 12, 14 is baked in an autoclave. The first carbon fiber sheet 24 is wrapped around a mandrill 100; the second carbon fiber sheet 26 is wrapped around the first carbon fiber sheet 24; and the third carbon fiber sheet 28 is wrapped around the second carbon fiber sheet 26. The mandrill 100 with the first, second and third carbon fiber sheets 24, 26, 28 is baked in an autoclave. The first carbon fiber sheet 24 is wrapped around a mandrill 100; the second carbon fiber sheet 26 is wrapped around the first carbon fiber sheet 24; and the third carbon fiber sheet 38 is wrapped around the second carbon fiber sheet 26. The mandrill 100 with the first, second and third carbon fiber sheets 24, 26, 38 is baked in an autoclave.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A carbon fiber tube comprising:
   a first carbon fiber sheet having a plurality of first fibers parallel to a first axis and a plurality of second fibers parallel to a second axis, said first axis of said first carbon fiber sheet forms a lengthwise axis of a carbon fiber tube, said plurality of second fibers are cross weaved with said plurality of said first fibers at an angle of no more than 90 degrees;
   a second carbon fiber sheet having a plurality of third fibers parallel to a third axis and a plurality of fourth fibers parallel to a fourth axis, said plurality of fourth fibers are cross weaved with said plurality of said third fibers at an angle of no more than 90 degrees, said third axis of said second carbon fiber sheet is oriented about 45 degrees relative to said lengthwise axis; and
   a third carbon fiber sheet having a plurality of fifth fibers parallel to a fifth axis and a plurality of sixth fibers parallel to a sixth axis, said fifth axis of said third carbon fiber sheet is aligned with said lengthwise axis of said carbon fiber tube, said plurality of sixth fibers are cross weaved with said plurality of said fifth fibers at an angle of no more than 90 degrees.

2. The carbon fiber tube of claim 1 wherein:
   there is a first spacing between said plurality of first and second fibers, a second spacing between said plurality of third and fourth fibers and a third spacing between said plurality of fifth and sixth fibers, where the first spacing, the second spacing and the third spacing are all the same.

3. The carbon fiber tube of claim 1 wherein:
   there is a first spacing between said plurality of first and second fibers, a second spacing between said plurality of third and fourth fibers and a third spacing between said plurality of fifth and sixth fibers, where two of said first spacing, said second spacing and said third spacing are the same.

4. The carbon fiber tube of claim 1 wherein:
   there is a first spacing between said plurality of first and second fibers, a second spacing between said plurality of third and fourth fibers and a third spacing between said plurality of fifth and sixth fibers, where said first spacing, said second spacing and said third spacing are all different.

5. A carbon fiber tube comprising:
   a first carbon fiber sheet having a plurality of first fibers parallel to a first axis and a plurality of second fibers parallel to a second axis, said first axis of said first carbon fiber sheet forms a lengthwise axis of a carbon fiber tube, said plurality of second fibers are cross weaved with said plurality of said first fibers of at substantially 90 degrees;
   a second carbon fiber sheet having a plurality of third fibers parallel to a third axis and a plurality of fourth fibers parallel to a fourth axis, said plurality of fourth fibers are cross weaved with said plurality of said first fibers of at substantially 90 degrees, said third axis of said second carbon fiber sheet is oriented about 45 degrees relative to said lengthwise axis; and
   a third carbon fiber sheet having a plurality of fifth fibers parallel to a fifth axis and a plurality of sixth fibers parallel to a sixth axis, said fifth axis of said third carbon fiber sheet is aligned with said lengthwise axis of said carbon fiber tube, said plurality of sixth fibers are cross weaved with said plurality of said fifth fibers at substantially 90 degrees.

6. The carbon fiber tube of claim 5 wherein:
   there is a first spacing between said plurality of first and second fibers, a second spacing between said plurality of third and fourth fibers and a third spacing between said plurality of fifth and sixth fibers, where the first spacing, the second spacing and the third spacing are all the same.

7. The carbon fiber tube of claim 5 wherein:
   there is a first spacing between said plurality of first and second fibers, a second spacing between said plurality of third and fourth fibers and a third spacing between said plurality of fifth and sixth fibers, where two of said first spacing, said second spacing and said third spacing are the same.

8. The carbon fiber tube of claim 5 wherein:
   there is a first spacing between said plurality of first and second fibers, a second spacing between said plurality of third and fourth fibers and a third spacing between said plurality of fifth and sixth fibers, where said first spacing, said second spacing and said third spacing are all different.

9. A carbon fiber tube comprising:

a first carbon fiber sheet having a plurality of first fibers parallel to a first axis and a plurality of second fibers parallel to a second axis, said first axis of said first carbon fiber sheet forms a lengthwise axis of a carbon fiber tube, said plurality of second fibers are cross weaved with said plurality of said first fibers at an angle of no more than 90 degrees;

a second carbon fiber sheet having a plurality of third fibers parallel to a third axis and a plurality of fourth fibers parallel to a fourth axis, said plurality of fourth fibers are cross weaved with said plurality of said third fibers at an angle of no more than 90 degrees, said third axis of said second carbon fiber sheet is oriented about 45 degrees relative to said lengthwise axis; and a third carbon fiber sheet having a plurality of fifth fibers parallel to a fifth axis and a plurality of sixth fibers parallel to a sixth axis, said fifth axis of said third carbon fiber sheet is aligned with said lengthwise axis of said carbon fiber tube, said plurality of sixth fibers are cross weaved with said plurality of said fifth fibers at an angle of no more than 90 degrees, wherein said first carbon fiber sheet is wrapped around a mandrill, said second carbon fiber sheet is wrapped around said first carbon fiber sheet, said third carbon fiber sheet is wrapped around said second carbon fiber sheet, the mandrill with said first, second and third sheets is baked in an autoclave.

10. The carbon fiber tube of claim 9 wherein:

there is a first spacing between said plurality of first and second fibers, a second spacing between said plurality of third and fourth fibers and a third spacing between said plurality of fifth and sixth fibers, where the first spacing, the second spacing and the third spacing are all the same.

11. The carbon fiber tube of claim 9 wherein:

there is a first spacing between said plurality of first and second fibers, a second spacing between said plurality of third and fourth fibers and a third spacing between said plurality of fifth and sixth fibers, where two of said first spacing, said second spacing and said third spacing are the same.

12. The carbon fiber tube of claim 9 wherein:

there is a first spacing between said plurality of first and second fibers, a second spacing between said plurality of third and fourth fibers and a third spacing between said plurality of fifth and sixth fibers, where said first spacing, said second spacing and said third spacing are all different.

* * * * *